United States Patent
Yonekubo et al.

(10) Patent No.: US 11,067,810 B2
(45) Date of Patent: Jul. 20, 2021

(54) HEAD-MOUNTED DISPLAY APPARATUS

(71) Applicant: SEIKO EPSON CORPORATION, Tokyo (JP)

(72) Inventors: Masatoshi Yonekubo, Suwa-gun (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 16/666,517

(22) Filed: Oct. 29, 2019

(65) Prior Publication Data
US 2020/0133005 A1  Apr. 30, 2020

(30) Foreign Application Priority Data
Oct. 30, 2018 (JP) .............................. JP2018-203697

(51) Int. Cl.
 *G02B 27/01* (2006.01)
 *G02B 27/00* (2006.01)
 *G03H 1/02* (2006.01)

(52) U.S. Cl.
 CPC ..... *G02B 27/0172* (2013.01); *G02B 27/0081* (2013.01); *G03H 1/0248* (2013.01); *G02B 2027/0112* (2013.01); *G02B 2027/0114* (2013.01); *G02B 2027/0174* (2013.01); *G02B 2027/0178* (2013.01); *G03H 2223/23* (2013.01); *G03H 2223/24* (2013.01)

(58) Field of Classification Search
 None
 See application file for complete search history.

(56) References Cited

U.S. PATENT DOCUMENTS

| | | | |
|---|---|---|---|
| 5,483,307 A | 1/1996 | Anderson | |
| 10,282,906 B2* | 5/2019 | Yonekubo | G02B 6/0031 |
| 2010/0045933 A1* | 2/2010 | Eberl | G02B 27/0172 |
| | | | 351/210 |
| 2011/0013245 A1* | 1/2011 | Tanaka | G02B 27/0172 |
| | | | 359/201.2 |
| 2013/0135747 A1 | 5/2013 | Yano | |

FOREIGN PATENT DOCUMENTS

| | | |
|---|---|---|
| JP | H07-036390 A | 2/1995 |
| JP | H08-190072 A | 7/1996 |
| JP | 2013-109301 A | 6/2013 |

\* cited by examiner

*Primary Examiner* — Jennifer D. Carruth
(74) *Attorney, Agent, or Firm* — Oliff PLC

(57) ABSTRACT

A head-mounted display apparatus according to an aspect of the present disclosure includes an imaging light generating device, a first deflection element including a first deflection section configured to deflect imaging light in a first direction and a second deflection section configured to deflect the imaging light in a second direction, a first diffraction element, and a second diffraction element. When a plane surrounded by the principal ray passing plane, the first principal ray, the second principal ray, and the first deflection section is taken as a first plane, and a plane surrounded by the second deflection section, the first principal ray, the second principal ray, and the first diffraction element is taken as a second plane, the first plane overlaps with at least a part of the second plane when viewed from the third direction and does not overlap with the second plane when viewed from the fourth direction.

5 Claims, 8 Drawing Sheets

HEAD-MOUNTED DISPLAY APPARATUS

The present application is based on, and claims priority from JP Application Serial Number 2018-203697, filed Oct. 30, 2018, the disclosure of which is hereby incorporated by reference herein in its entirety.

BACKGROUND

1. Technical Field

The present disclosure relates to a head-mounted display apparatus.

2. Related Art

A head-mounted display apparatus is known that uses a plurality of reflection surfaces to guide imaging light to the eye of an observer while reflecting the imaging light. JP-A-8-190072 discloses a head-mounted display apparatus including a spatial light modulator that generates imaging light, a projection lens, a projection screen, a beam splitter, and a reflection mirror.

In the head-mounted display apparatus of JP-A-8-190072, an image can be magnified by a plurality of reflection surfaces being provided at a subsequent stage of the projection lens, whereas there is a problem in that the apparatus increases in size because a plurality of optical members is required to be arranged around the face. Furthermore, depending on design parameters such as size, weight, arrangement, and the like of the various optical members, there are problems in that a load is applied to the nose of a user and use feeling deteriorates.

SUMMARY

A head-mounted display apparatus according to an aspect of the present disclosure includes an imaging light generating device, a first deflection element including a first deflection section configured to deflect, in a first direction, imaging light emitted from the imaging light generating device and a second deflection section configured to deflect, in a second direction intersecting with the first direction, the imaging light deflected by the first deflection section, a first diffraction element configured to diffract the imaging light deflected by the second deflection section, and a second diffraction element configured to diffract the imaging light diffracted by the first diffraction element to form an exit pupil. When a principal ray of imaging light emitted from a center of a display region of the imaging light generating device and to be incident on the first deflection element is taken as a central principal ray, the central principal ray coincides with a normal line of a virtual plane located between the imaging light generating device and the first deflection section, and when a direction that the first direction is projected on the virtual plane is taken as a third direction of the virtual plane and a direction orthogonal to the third direction is taken as a fourth direction, a plane through which the principal ray of imaging light emitted from an entire region of the display region passes on the virtual plane is taken as a principal ray passing plane, a principal ray configured to pass through a point at a center of the principal ray passing plane in the third direction and at a first end of the principal ray passing plane in the fourth direction is taken as a first principal ray and a principal ray configured to pass through a second end of the principal ray passing plane in the fourth direction is taken as a second principal ray, a plane surrounded by the principal ray passing plane, the first principal ray, the second principal ray, and the first deflection section is taken as a first plane, and a plane surrounded by the second deflection section, the first principal ray, the second principal ray, and the first diffraction element is taken as a second plane, the first plane overlaps with at least a part of the second plane when viewed from the third direction and does not overlap with the second plane when viewed from the fourth direction.

In the head-mounted display apparatus according to the aspect of the present disclosure, the first plane may be non-parallel to the second plane when viewed from the fourth direction.

The head-mounted display apparatus according to the aspect of the present disclosure may include a diaphragm between the imaging light generating device and the first deflection element on an optical path of the central principal ray. In this case, a position of the diaphragm on the optical path of the central principal ray and a position of the first diffraction element in the second direction may coincide with each other.

The head-mounted display apparatus according to the aspect of the present disclosure may further include a second deflection element configured to reflect, toward the second diffraction element, the imaging light diffracted by the first diffraction element.

In the head-mounted display apparatus according to the aspect of the present disclosure, the first diffraction element and the second diffraction element may be constituted by a reflection-type volume hologram.

DESCRIPTION OF EXEMPLARY EMBODIMENTS

First Exemplary Embodiment

A first exemplary embodiment of the present disclosure will be described below with reference to FIG. 1 to FIG. 4.

Figure 1:
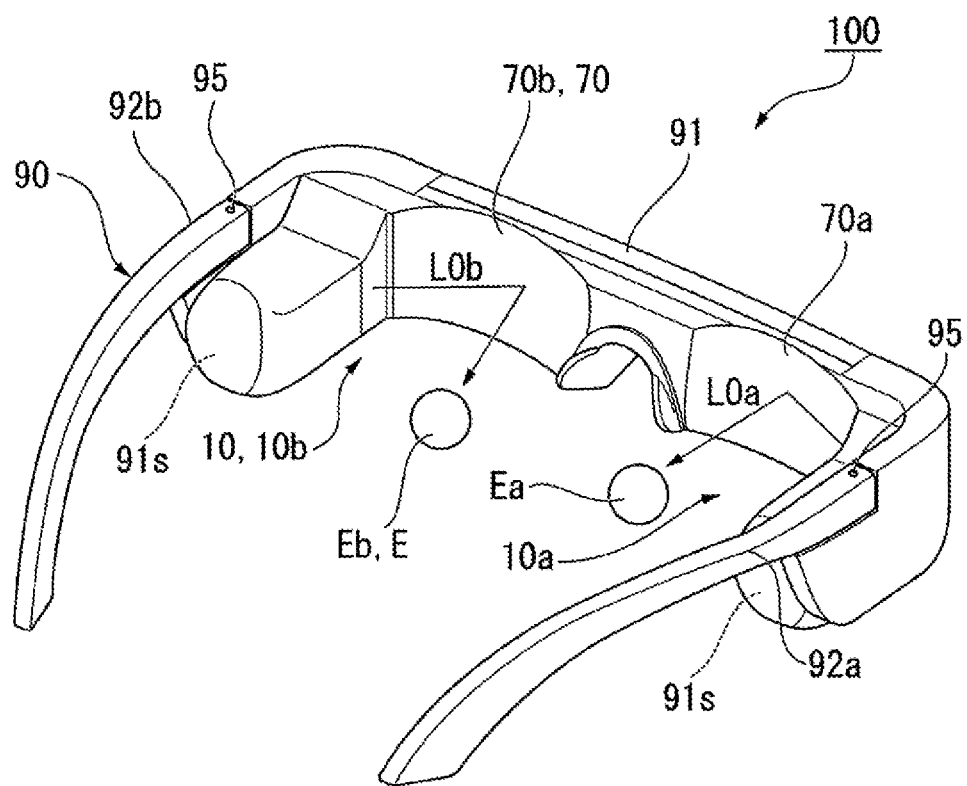
FIG. 1 is a perspective view illustrating an external appearance of a head-mounted display apparatus.
Figure 1:
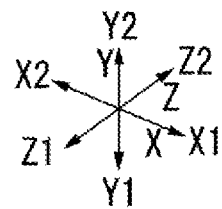
Figure 2:
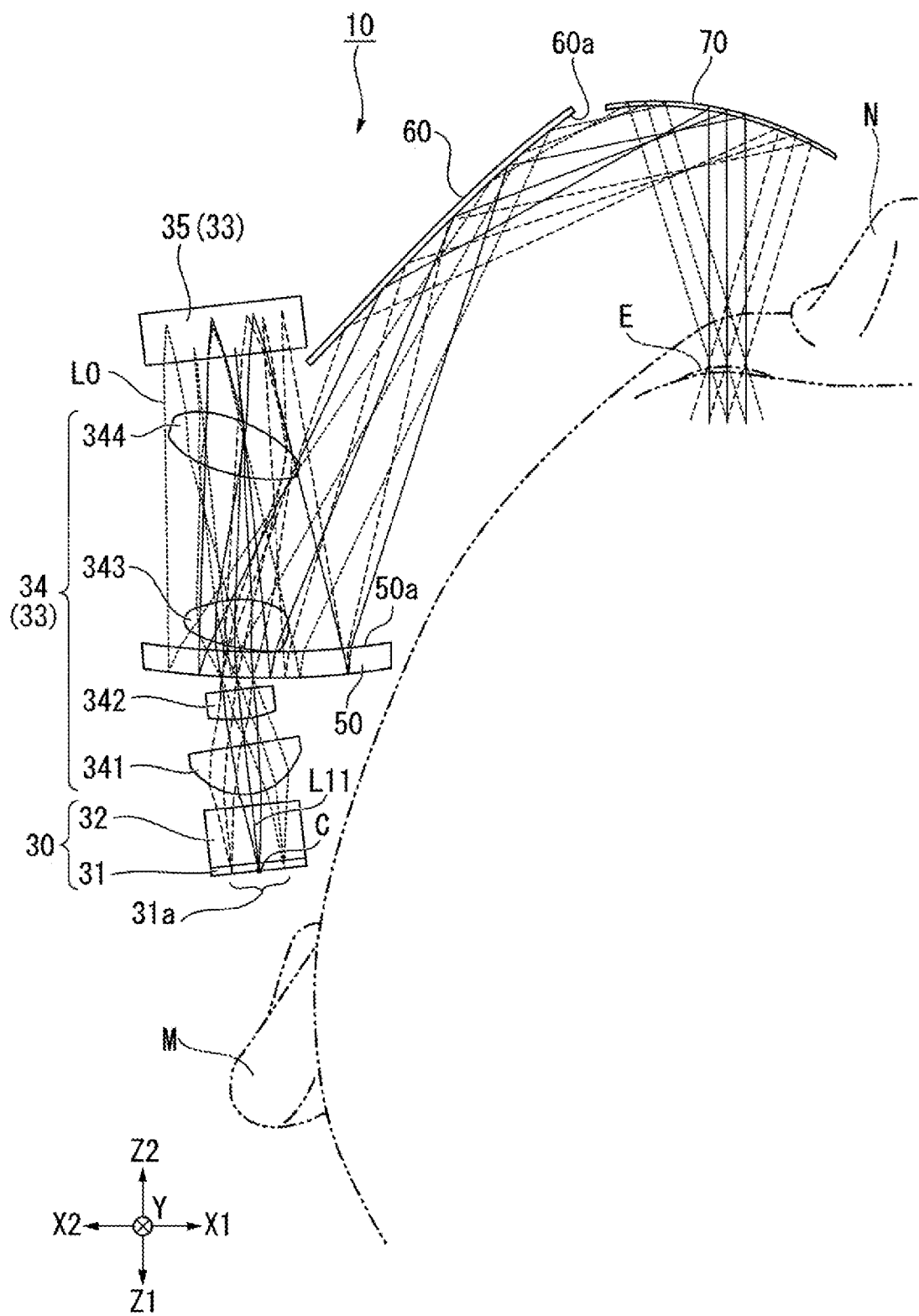
FIG. 2 is a top view illustrating a configuration of an optical system in a head-mounted display apparatus according to a first exemplary embodiment.
Figure 3:
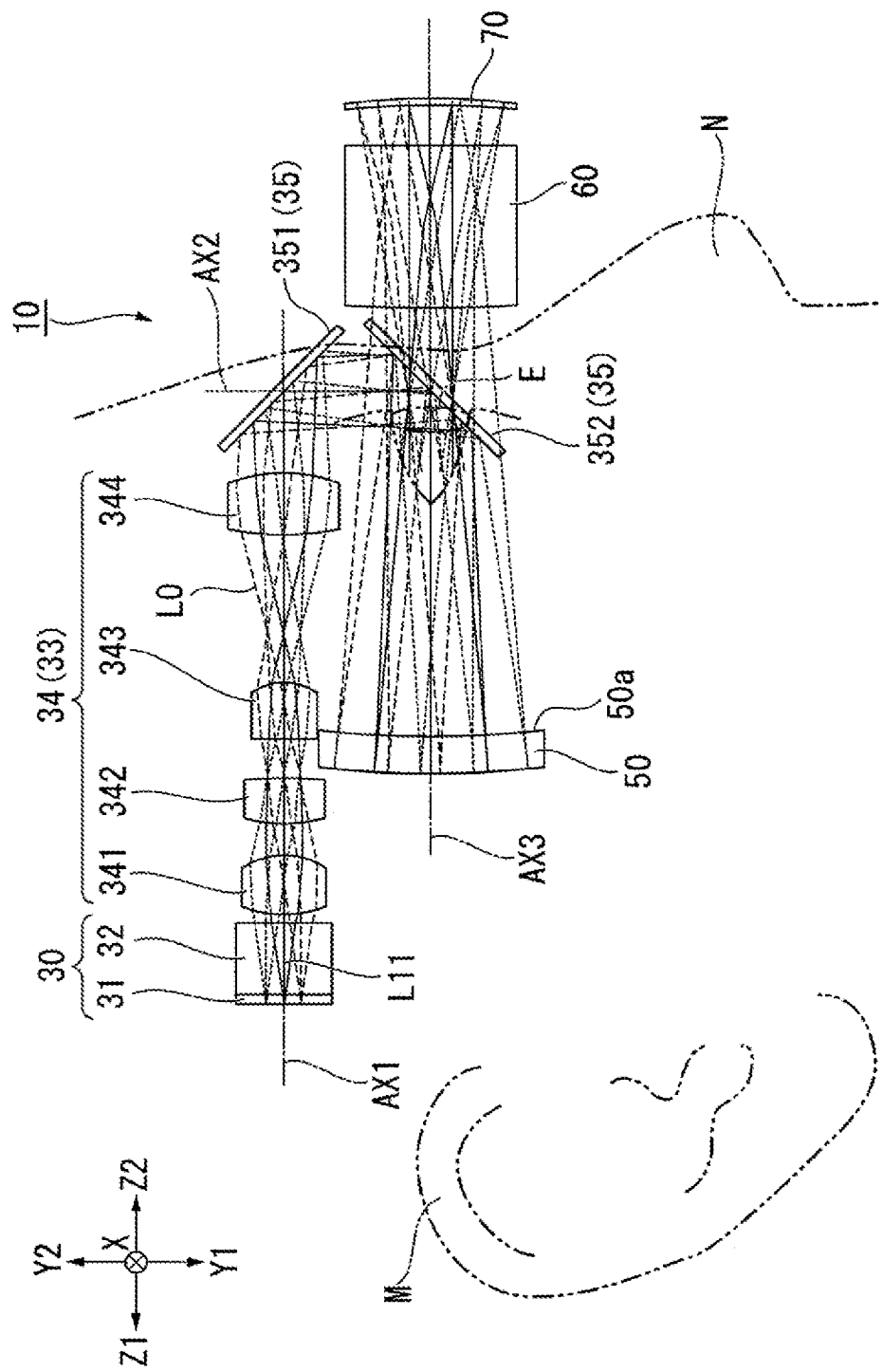
FIG. 3 is a side view illustrating the configuration of the optical system of the head-mounted display apparatus.

FIG. 1 is a perspective view illustrating an external appearance of a head-mounted display apparatus. FIG. 2 is a top view illustrating a configuration of an optical system in the head-mounted display apparatus. FIG. 3 is a side view illustrating the configuration of the optical system of the head-mounted display apparatus.

In the following description, the head-mounted display apparatus is simply referred to as a display apparatus. Furthermore, in the drawings, the dimensions of some components may be scaled differently for ease of understanding for the components.

In each of the drawings below, the following directions are defined using a front and rear direction, a left and right direction, and an up and down direction in a state in which a user wears a display apparatus 100 on the head. The up and down direction is taken as a first direction Y, a side from above toward below is taken as one side Y1 of the first direction Y, and a side from below toward above is taken as the other side Y2 of the first direction Y. The front and rear direction is taken as a second direction Z, a side from front toward rear is taken as one side Z1 of the second direction Z, and a side from rear toward front is taken as the other side Z2 of the second direction Z. The left and right direction is taken as a third direction X, a side from left toward right is taken as one side X1 of the third direction X, and a side from right toward left is taken as the other side X2 of the third direction X. The first direction Y, the second direction Z, and the third direction X intersect with one another.

Furthermore, when the above-described directions are defined using constituent elements of the display apparatus 100, a direction in which a second diffraction element 70a of a right-eye optical system 10a and a second diffraction element 70b of a left-eye optical system 10b are aligned is taken as the third direction X, a side from the second diffraction element 70b toward the second diffraction element 70a is taken as X1, and a side from the second diffraction element 70a toward the second diffraction element 70b is taken as X2. In an optical system 10 described below, a direction in which a first deflection section 351 and a second deflection section 352 are aligned is taken as the first direction Y, the one side is taken as Y1, and the other side is taken as Y2. A direction in which an imaging light projecting device 30 and the first deflection section 351 are aligned is taken as the second direction Z, a side from the first deflection section 351 toward the imaging light projecting device 30 is taken as Z1, and a side from the imaging light projecting device 30 toward the first deflection section 351 is taken as Z2.

As illustrated in FIG. 1, the display apparatus 100 includes the right-eye optical system 10a that causes imaging light L0a to be incident on the right eye Ea and the left-eye optical system 10b that causes imaging light L0b to be incident on the left eye Eb. For example, the display apparatus 100 has a shape like glasses. Specifically, the display apparatus 100 further includes a housing 90 that holds the right-eye optical system 10a and the left-eye optical system 10b. The display apparatus 100 is worn on the head of an observer with the housing 90.

The display apparatus 100 includes, as the housing 90, a frame 91, a temple 92a provided on a right side of the frame 91 and locked to the right ear of the observer, and a temple 92b provided on a left side of the frame 91 and locked to the left ear of the observer. The frame 91 has storage spaces 91s at both side portions, and optical elements, such as the imaging light projecting device 30, a light-guiding optical system 33, a first diffraction element 50, and the like, which constitute the optical system 10 described below, are accommodated in the storage space 91s. The temples 92a and 92b are foldably connected to the frame 91 by a hinge 95.

The right-eye optical system 10a and the left-eye optical system 10b have the same basic configuration. Therefore, the right-eye optical system 10a and the left-eye optical system 10b will be described as the optical system 10 without distinction in the description below.

As illustrated in FIG. 2 and FIG. 3, the display apparatus 100 includes, as the optical system 10, the imaging light projecting device 30, the light-guiding optical system 33, the first diffraction element 50, a second mirror 60 (second deflection element), and a second diffraction element 70. The light-guiding optical system 33 includes a lens system 34 and a first mirror 35 (first deflection element). The first diffraction element 50 and the second diffraction element 70 are each constituted by a reflection-type volume hologram which will be described below.

In the optical system 10, focusing on a traveling direction of imaging light L0, an imaging light generating device 31 emits the imaging light L0 toward the light-guiding optical system 33 with a projection optical system 32, and the light-guiding optical system 33 emits the incident imaging light L0 toward the first mirror 35. The first mirror 35 deflects the incident imaging light L0 and emits the resulting light toward the first diffraction element 50. The first diffraction element 50 emits the imaging light L0 toward the second diffraction element 70 via the second mirror 60. The second diffraction element 70 emits the incident imaging light L0 toward the eye E of the observer.

The imaging light projecting device 30 includes the imaging light generating device 31 and the projection optical system 32. The imaging light generating device 31 generates the imaging light L0. The projection optical system 32 projects the imaging light L0 generated by the imaging light generating device 31. The projection optical system 32 includes a plurality of lenses. The imaging light generating device 31 is constituted by a display panel such as an organic electroluminescent display element. This constitution can provide the display apparatus 100 reduced in size and capable of displaying a high-quality image.

Furthermore, the imaging light generating device 31 may be constituted by an illumination light source (not illustrated) and a display panel such as a liquid crystal display element that modulates illumination light exiting from the illumination light source. This constitution allows the illumination light source to be selected as appropriate, and thus has an advantage of increasing a degree of selection flexibility in a wavelength characteristic of the imaging light L0. In this case, the imaging light generating device 31 may include one display panel that enables color display. Alternatively, the imaging light generating device 31 may include a plurality of display panels corresponding to respective colors and a synthesis optical system, such as a dichroic prism, that synthesizes imaging light in respective colors exiting from the plurality of display panels. Alternatively, the imaging light projecting device 30 may be constituted so as to modulate laser light by a micromirror device.

In the following description, a principal ray of the imaging light L0 exiting from a center C of a display region 31a of the imaging light generating device 31 and incident on the first mirror 35 is referred to as a central principal ray L11. Furthermore, an axis coinciding with an optical path of the central principal ray L11 between the imaging light generating device 31 and the first deflection section 351 is referred to as a first optical axis AX1. An axis coinciding with an optical path of the central principal ray L11 between the first deflection section 351 and the second deflection section 352 after the imaging light L0 is deflected by the first deflection section 351 is referred to as a second optical axis AX2. An axis coinciding with an optical path of the central principal ray L11 between the second deflection section 352 and the first diffraction element 50 after the imaging light L0 is deflected by the second deflection section 352 is referred to as a third optical axis AX3.

The first optical axis AX1 and the third optical axis AX3 substantially coincide with the second direction Z and are parallel to each other. The second optical axis AX2 substantially coincides with the first direction Y and is orthogonal to the first optical axis AX1 and the third optical axis AX3.

The light-guiding optical system 33 includes the lens system 34 on which the imaging light L0 exiting from the imaging light projecting device 30 is incident, and the first mirror 35 that deflects the imaging light L0 exiting from the lens system 34 and turns back the optical path. The lens system 34 is constituted of a plurality of lenses arranged on the first optical axis AX1.

In the exemplary embodiment, the lens system 34 includes a first lens 341, a second lens 342, a third lens 343, and a fourth lens 344 arranged in order from a side near the imaging light projecting device 30 on the first optical axis AX1. Each of the first lens 341, the second lens 342, the third lens 343, and the fourth lens 344 is constituted by a free curved surface lens or a spherical lens. The shapes and the number of the plurality of lenses constituting the lens system 34 can be changed as appropriate.

As illustrated in FIG. 3, the first mirror 35 includes the first deflection section 351 and the second deflection section 352. Each of the first deflection section 351 and the second deflection section 352 is constituted by a total reflection mirror. The first deflection section 351 is arranged to be inclined so as to form an angle of approximately 45° with the first optical axis AX1 and the second optical axis AX2 on the light exit side of the lens system 34 on the first optical axis AX1.

The second deflection section 352 is arranged to be inclined so as to form an angle of approximately 45° with the second optical axis AX2 and the third optical axis AX3 on the light exit side of the first deflection section 351 on the second optical axis AX2. With this configuration, the first deflection section 351 deflects the imaging light L0 exiting from the imaging light generating device 31 toward the one side Y1 (lower side) of the first direction Y. Furthermore, the second deflection section 352 deflects the imaging light L0 deflected by the first deflection section 351 toward the one side Z1 (rear side) of the second direction Z.

In the exemplary embodiment, the first deflection section 351 and the second deflection section 352 are constituted of separate mirrors, but may be constituted of an integrated mirror. In this case, a mirror having a shape in which a reflection surface with a plane shape is bent may be used, or a mirror having a reflection surface having a curved surface shape may be used. Furthermore, each of the first deflection section 351 and the second deflection section 352 may be constituted by a half mirror. According to this configuration, a range in which the outside light can be visually recognized can be expanded.

Figure 4:
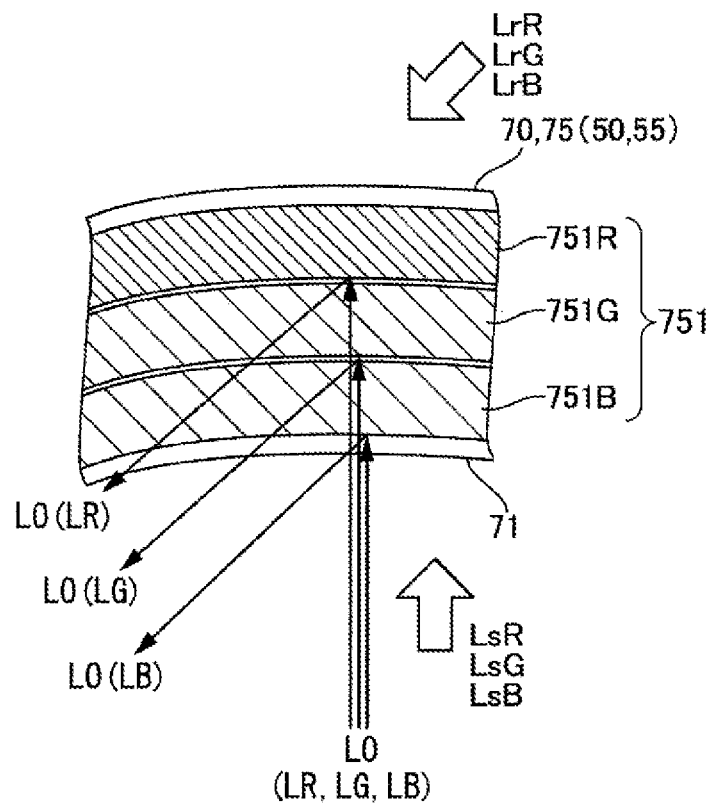
FIG. 4 is an explanatory diagram of interference fringes of a diffraction element.

FIG. 4 is an explanatory diagram of interference fringes 751 of the second diffraction element 70.

As illustrated in FIG. 4, the second diffraction element 70 includes a reflection-type volume hologram 75, and the reflection-type volume hologram 75 is a partial reflection-type diffraction optical element. Therefore, the second diffraction element 70 forms a partial transmissive reflective combiner. Accordingly, the outside light is incident on the eye E of the observer via the second diffraction element 70, and thus the observer can visually recognize an image in which the imaging light L0 formed by the imaging light generating device 31 and the outside light (background) are superimposed on each other.

The second diffraction element 70 faces the eye E of the observer. An incident surface 71 of the second diffraction element 70 on which the imaging light L0 is incident has a concave surface being recessed in a direction away from the eye E. In other words, the incident surface 71 has a shape having a central portion recessed and curved with respect to a peripheral portion in the incident direction of the imaging light L0. Thus, the imaging light L0 can be efficiently condensed toward the eye E of the observer.

The second diffraction element 70 includes the interference fringes 751 having a pitch corresponding to a specific wavelength. The interference fringes 751 are recorded as a difference in refractive index in a hologram photosensitive layer. The interference fringes 751 are inclined in one direction with respect to the incident surface 71 of the second diffraction element 70 so as to correspond to a specific incident angle. Therefore, the second diffraction element 70 diffracts and then deflects the imaging light L0 in a predetermined direction. The specific wavelength and the specific incident angle respectively correspond to a wavelength and an incident angle of the imaging light L0. The interference fringes 751 of this type can be formed by performing interference exposure on the holographic photosensitive layer by using reference light Lr and object light Ls.

In the exemplary embodiment, the imaging light L0 is light for color display. Therefore, in the second diffraction element 70, interference fringes 751R, 751G, and 751b are formed at a pitch corresponding to a specific wavelength. For example, the interference fringes 751R are formed at a pitch corresponding to a wavelength of 615 nm, for example, in a wavelength range of wavelengths from 580 nm to 700 nm in the red region. The interference fringes 751G are formed at a pitch corresponding to a wavelength of 535 nm, for example, in a wavelength range of wavelengths from 500 nm to 580 nm in the green region. The interference fringes 751B are formed at a pitch corresponding to a wavelength of 460 nm, for example, in a wavelength range of wavelengths from 400 nm to 500 nm in the blue region.

The above-described configuration can be formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Note that the interference fringes 751R, 751G, and 751B can be superimposed and formed in one layer, by dispersing a photosensitive material having sensitivity corresponding to the respective wavelengths in the holographic photosensitive layer and then performing interference exposure on the holographic photosensitive layer by using the reference light LrR, LrG, and LrB and the object light LsR, LsG, and LsB having the respective wavelengths. Furthermore, light having a spherical wave can be used as the reference light LrR, LrG, and LrB and the object light LsR, LsG, and LsB.

Since the first diffraction element 50 and the second diffraction element 70 have the same basic configuration, detailed descriptions of the first diffraction element 50 are omitted, but the first diffraction element 50 includes a reflection-type volume hologram 55. An incident surface 50a of the first diffraction element 50 on which the imaging light L0 is incident has a concave surface being recessed. In other words, the incident surface 50a has a shape having a central portion recessed and curved with respect to a peripheral portion in the incident direction of the imaging light L0. Thus, the imaging light L0 can be efficiently deflected toward the second mirror 60.

Figure 5:
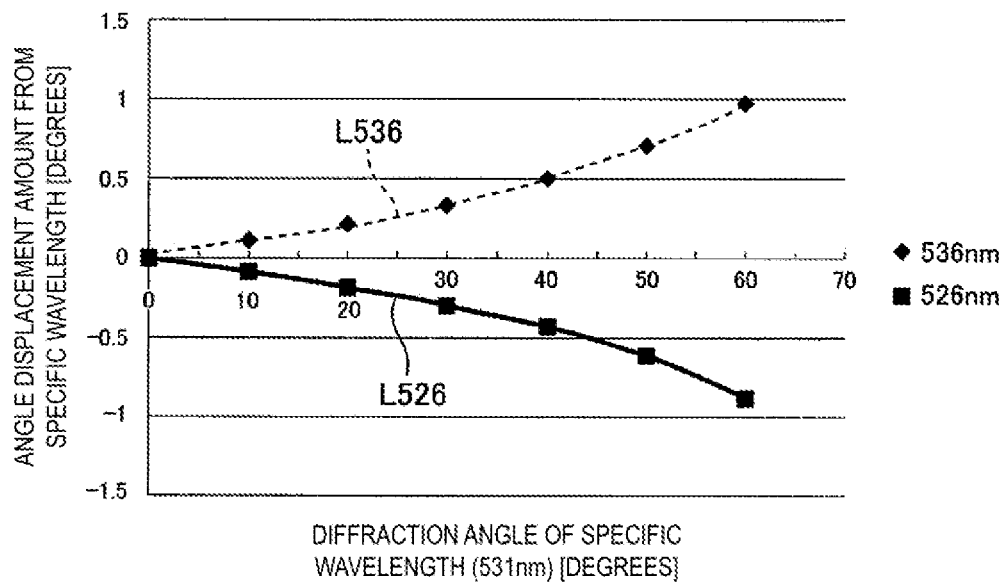
FIG. 5 is an explanatory diagram illustrating diffraction characteristics of a first diffraction element and a second diffraction element.

FIG. 5 is an explanatory diagram illustrating diffraction characteristics of the first diffraction element 50 and the second diffraction element 70. FIG. 5 illustrates a difference in a diffraction angle between the specific wavelength and a peripheral wavelength when a light ray is incident on a single point on the volume hologram. In FIG. 5, when the specific wavelength is set to 531 nm, displacement in the diffraction angle of peripheral wavelength light having a wavelength of 526 nm is indicated by a solid line L526, and displacement in the diffraction angle of peripheral wavelength light having a wavelength of 536 nm is indicated by a dashed line L536.

As illustrated in FIG. 5, even when light rays are incident on the same interference fringes recorded in the volume hologram, the longer the wavelength of the light ray is, the greater the diffraction becomes, and the smaller the wavelength of the light ray is, the smaller the diffraction becomes. Accordingly, when the two diffraction elements (the first diffraction element 50 and the second diffraction element 70) are used, if light having a longer wavelength and light having a shorter wavelength than the specific wavelength are not caused to be incident while taking into consideration the incident angles, an aberration cannot be appropriately compensated. In addition, because the diffraction angle varies depending on the number of interference fringes, the configuration of the interference fringes is required to be considered. In the optical system 10 illustrated in FIG. 2 and FIG. 3, in accordance with whether the sum of the number of times of forming intermediate images between the first diffraction element 50 and the second diffraction element 70 and the number of reflection times at the second mirror 60 is odd or even, the incident direction to the second diffraction element 70 and the like is made appropriate, and the aberration compensation is thus possible.

The second mirror 60 has a reflection surface 60a with a central portion recessed relative to the peripheral portion. The reflection surface 60a is formed from a spherical surface, an aspherical surface, or a free curved surface. The second mirror 60 reflects the imaging light L0 exiting from the first diffraction element 50 and emits the resulting light toward the second diffraction element 70. The second mirror 60 is constituted by a half mirror. With this, a range in which the outside light can be visually recognized can be expanded.

As illustrated in FIG. 3, the imaging light projecting device 30, the first lens 341, the second lens 342, the third lens 343, and the fourth lens 344 that constitute the lens system 34, and the first deflection section 351 of the first mirror 35 are arranged at a first height in the first direction Y (up and down direction). Furthermore, the first diffraction element 50, the second deflection section 352 of the first mirror 35, the second mirror 60, and the second diffraction element 70 are arranged at a second height in the first direction Y (up and down direction). The second height is lower than the first height.

In other words, when viewed along the traveling direction of the imaging light L0 exiting from the imaging light projecting device 30, the imaging light L0 travels at a substantially constant height until reaching the first mirror 35 via the lens system 34, after the optical path is bent downward by the first mirror 35, the imaging light travels at a substantially constant height at a position lower than that before being incident on the first mirror 35, and reaches the second diffraction element 70 via the first diffraction element 50 and the second mirror 60.

The arrangement of the optical elements described above is represented as follows by being expressed with the path of light.

Figure 6:
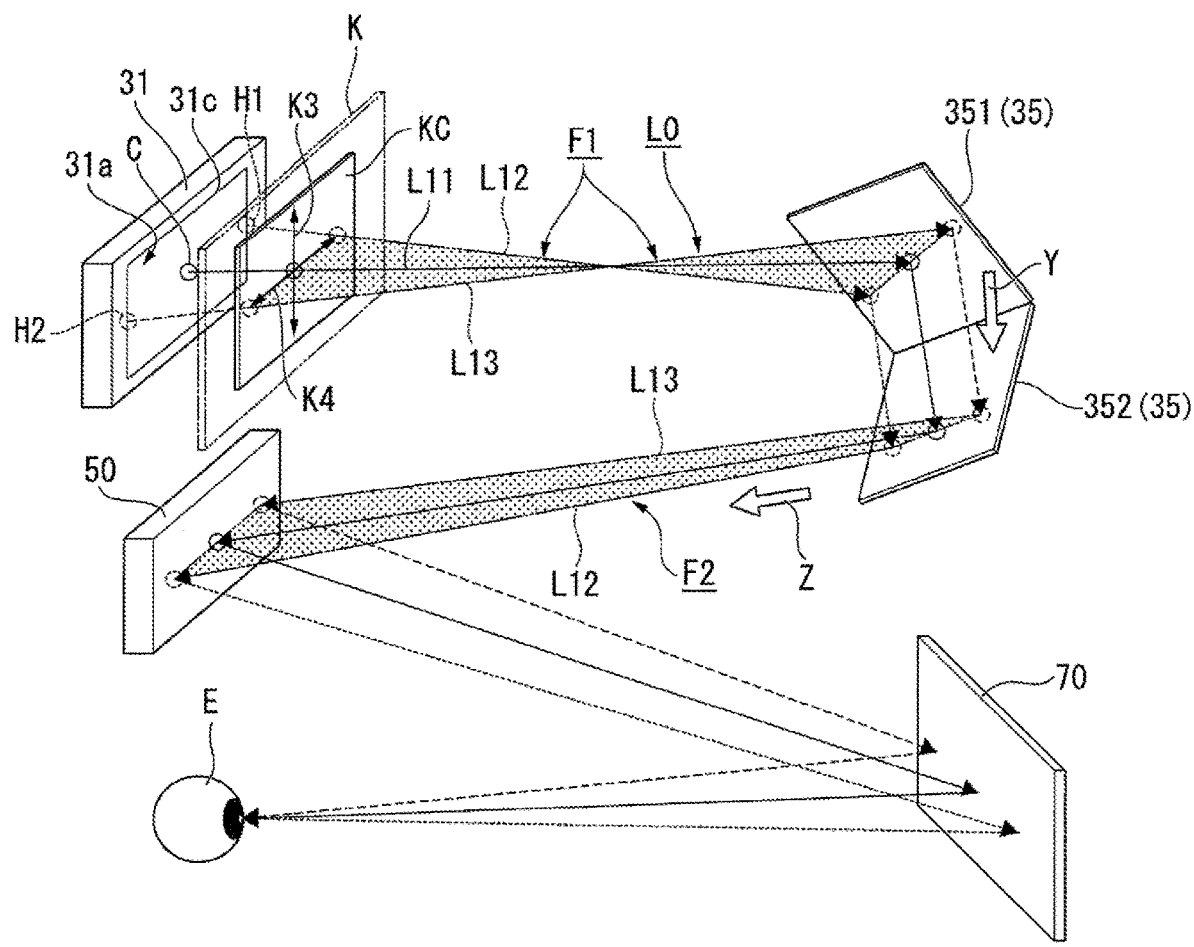
FIG. 6 is a diagram illustrating an optical path of imaging light exiting from an imaging light generating device.

FIG. 6 is a diagram three-dimensionally illustrating the optical path of the imaging light L0 exiting from the imaging light generating device 31. In FIG. 6, only the imaging light generating device 31, the first mirror 35, the first diffraction element 50, and the second diffraction element 70 among the components of the display apparatus 100 are extracted and illustrated.

As illustrated in FIG. 6, a virtual plane K parallel to a display surface 31c of the imaging light generating device 31 is assumed between the imaging light generating device 31 and the first deflection section 351. In this case, the central principal ray L11 from the imaging light generating device 31 coincides with the normal line of the virtual plane K located between the imaging light generating device 31 and the first deflection section 351.

Here, a direction in which the first direction Y is projected on the virtual plane K is taken as a third direction K3 of the virtual plane K, and a direction orthogonal to the third direction K3 is taken as a fourth direction K4. In addition, a plane through which the principal ray of the imaging light L0 exiting from all the region in the display region 31a passes on the virtual plane K is taken as a principal ray passing plane KC. In the center of the principal ray passing plane KC in the third direction K3, a principal ray passing through a first end H1 of the principal ray passing plane KC in the fourth direction K4 is taken as a first principal ray L12, and a principal ray passing through a second end H2 of the principal ray passing plane KC in the fourth direction K4 is taken as a second principal ray L13.

In addition, a plane surrounded by the principal ray passing plane KC, the first principal ray L12, the second principal ray L13, and the first deflection section 351 is taken as a first plane F1. A plane surrounded by the second deflection section 352, the first principal ray L12, the second principal ray L13, and the first diffraction element 50 is taken as a second plane F2. As described above, the first plane F1 and the second plane F2 are defined.

Using the definition described above, in the display apparatus 100 according to the exemplary embodiment, the first plane F1 overlaps with at least a part of the second plane F2 when viewed from the third direction K3, and does not overlap with the second plane F2 when viewed from the fourth direction K4. Particularly in the case of the exemplary embodiment, when viewed from the fourth direction K4, the first plane F1 and the second plane F2 are substantially parallel to each other.

In other words, roughly, as illustrated in FIG. 2, the imaging light L0 after exiting from the imaging light generating device 31 until being incident on the first mirror 35 and the imaging light L0 after being turned by the first mirror 35 until being incident on the first diffraction element 50 at least partially overlap with each other when viewed from the up and down direction (first direction Y). On the other hand, as illustrated in FIG. 3, the imaging light L0 after exiting from the imaging light generating device 31 until being incident on the first mirror 35 and the imaging light L0 after being turned by the first mirror 35 until being incident on the first diffraction element 50 do not overlap with each other when viewed from the left and right direction (third direction X).

In the display apparatus 100 according to the exemplary embodiment, as illustrated in FIG. 2 and FIG. 3, the optical path of the imaging light L0 reaching from the imaging light generating device 31 to the second diffraction element 70 is bent in the up and down direction, and various optical components are arranged on the two planes at different heights, respectively. With this configuration, an area when viewed from the first direction Y (up and down direction) can be made smaller than in the known apparatus, and the display apparatus 100 can be reduced in size.

Additionally, the imaging light L0 is wave-guided in the air between the first diffraction element 50 and the second diffraction element 70, and a component such as a light guide plate is not used. Therefore, the center of gravity of the display apparatus 100 is located in the vicinity of an ear M of the observer, and a load applied to a nose N can be reduced. This makes it possible to suppress the display apparatus 100 from slipping down, and improve use feeling of the display apparatus 100.

Second Exemplary Embodiment

Below, a second exemplary embodiment according to the present disclosure will be described with reference to FIG. 7.

The basic configuration of a display apparatus according to the second exemplary embodiment is the same as that of the first exemplary embodiment, and arrangement of part of the optical components is different from that of the first exemplary embodiment. Therefore, the overall configuration of the display apparatus will not be described.

Figure 7:
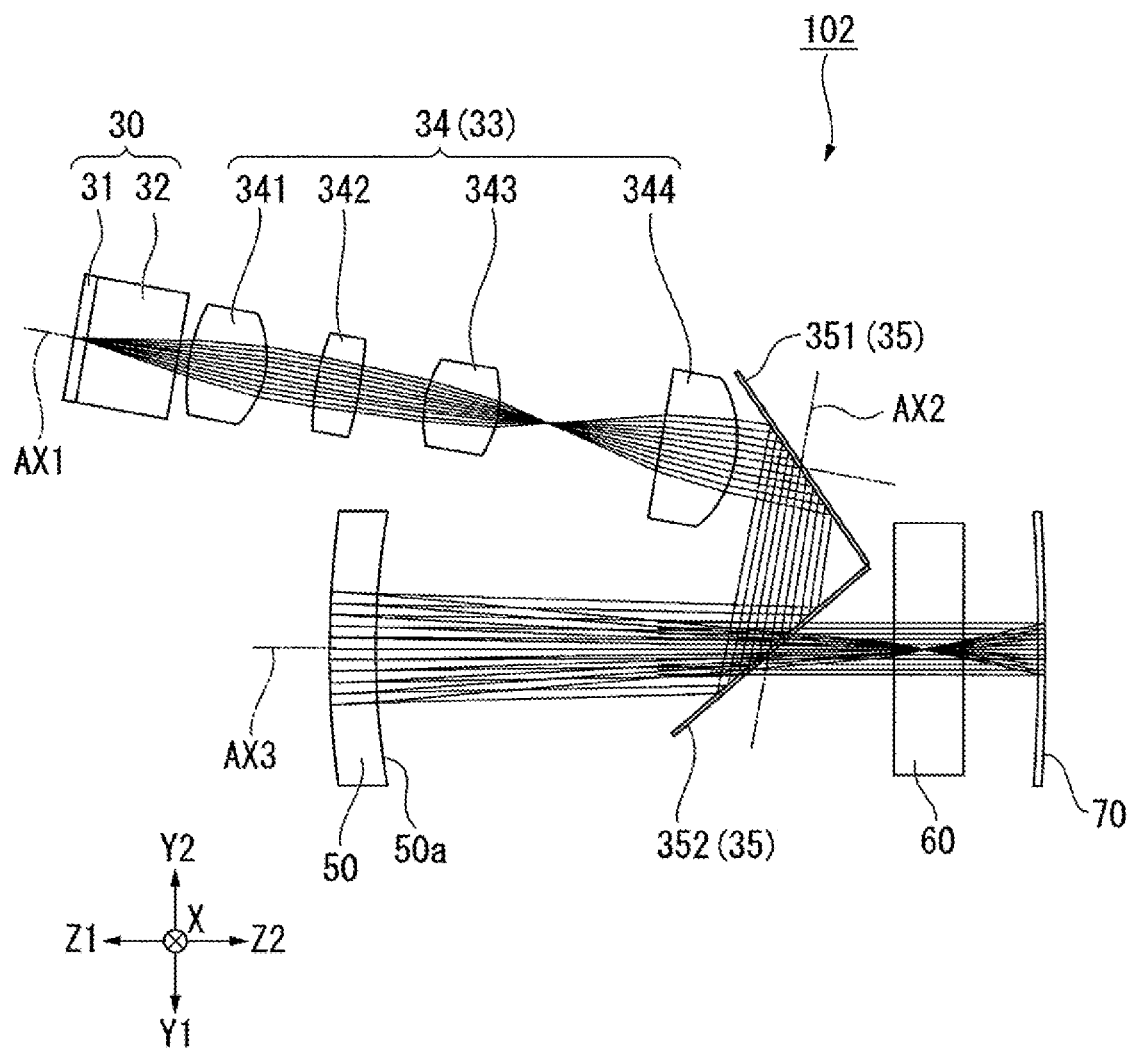
FIG. 7 is a side view illustrating a configuration of an optical system in a head-mounted display apparatus according to a second exemplary embodiment.

FIG. 7 is a side view illustrating the configuration of the optical system in the display apparatus according to the second exemplary embodiment.

In FIG. 7, the components common to those of the drawings of the first exemplary embodiment are denoted with the same reference numerals, and detailed description thereof is omitted.

As illustrated in FIG. 7, in a display apparatus 102 according to the second exemplary embodiment, the first optical axis AX1 is not parallel to the third optical axis AX3, and is inclined by approximately 10° relative to the third optical axis AX3. In this description, for the inclination angle of the first optical axis AX1, an angle viewed clockwise is expressed by a positive value, and an angle viewed counterclockwise is expressed by a negative value. The imaging light projecting device 30 and the lens system 34 are arranged on the first optical axis AX1. The imaging light projecting device 30 and the lens system 34 are inclined in a direction where the position of the imaging light projecting device 30 is higher than the position of the imaging light projecting device 30 according to the first exemplary embodiment.

The third optical axis AX3 substantially coincides with the second direction Z in the same manner as the first exemplary embodiment. Accordingly, the arrangement of the first diffraction element 50, the second mirror 60, and the second diffraction element 70 is the same as that of the first exemplary embodiment. Furthermore, in accordance with the inclination of the first optical axis AX1 relative to the third optical axis AX3, the second optical axis AX2 is also inclined by approximately 10° relative to the first direction Y.

Other configurations of the display apparatus 102 are the same as those of the first exemplary embodiment.

In the exemplary embodiment, in the same manner as the first exemplary embodiment, when the arrangement of the respective optical elements is expressed using the respective planes illustrated in FIG. 6, the first plane F1 is non-parallel to the second plane F2 when viewed from the fourth direction K4.

In the exemplary embodiment as well, it is possible to obtain the same effects as those of the first exemplary embodiment that the area when viewed from the first direction Y (up and down direction) can be made smaller than in the known apparatus and the display apparatus 102 can be reduced in size, and the load applied to the nose can be reduced and the use feeling of the display apparatus 102 can be improved.

For example, when the position of each of the lenses 341, 342, 343, and 344 arranged on the first optical axis AX1 and the position of the first diffraction element 50 arranged on the third optical axis AX3 are brought close to each other and interference between these elements causes a problem, as in the display apparatus 102 according to the exemplary embodiment, by arranging the first optical axis AX1 to be inclined relative to the third optical axis AX3, the above-described problem can be improved.

Note that the inclination angle of the first optical axis AX1 can be increased in an allowable range of dimensional increase in the display apparatus 102 in the up and down direction. Note that the inclination angle of the first optical axis AX1 relative to the third optical axis AX3 may be approximately equal to or less than 45°. Additionally, depending on the arrangement of the elements, the first optical axis AX1 may be inclined in a direction that the inclination angle of the first optical axis AX1 is negative, that is, a direction that the position of the imaging light projecting device 30 becomes lower than the position of the imaging light projecting device 30 according to the first exemplary embodiment.

Third Exemplary Embodiment

Below, a third exemplary embodiment according to the present disclosure will be described with reference to FIG. 8.

The basic configuration of a display apparatus according to the third exemplary embodiment is the same as that of the first exemplary embodiment, and arrangement of part of the optical components is different from that of the first exemplary embodiment. Therefore, the overall configuration of the display apparatus will not be described.

Figure 8:
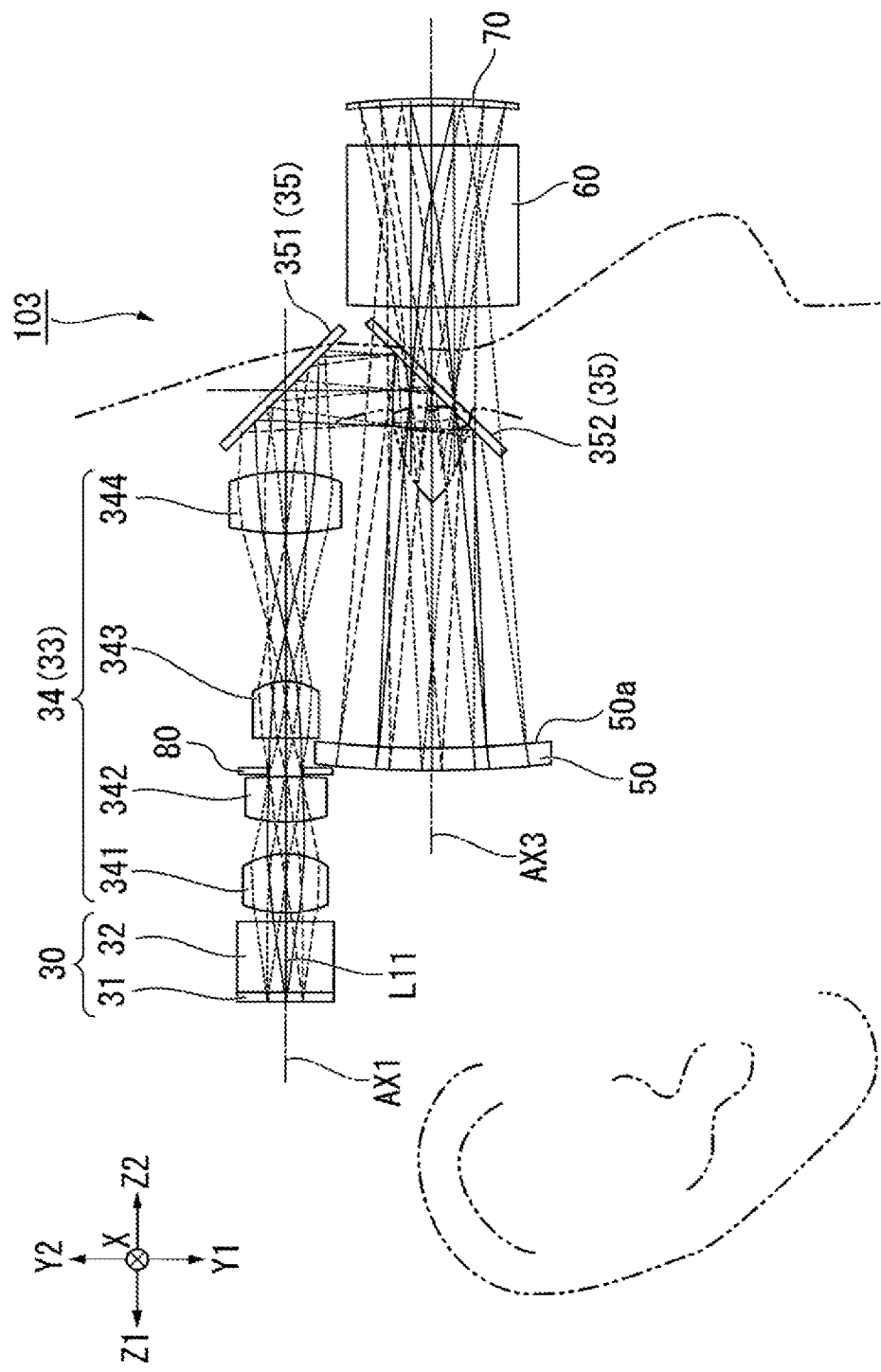
FIG. 8 is a side view illustrating a configuration of an optical system in a head-mounted display apparatus according to a third exemplary embodiment.

FIG. 8 is a side view illustrating the configuration of the optical system in the display apparatus according to the third exemplary embodiment.

In FIG. 8, the components common to those of the drawings of the first exemplary embodiment are denoted with the same reference numerals, and detailed description thereof is omitted.

As illustrated in FIG. 8, a display apparatus 103 according to the third exemplary embodiment includes the imaging light projecting device 30, the light-guiding optical system 33, the first diffraction element 50, the second mirror 60, the second diffraction element 70, and a diaphragm 80. The diaphragm 80 is provided between the imaging light generating device 31 and the first mirror 35 on the optical path of the central principal ray L11, that is, on the first optical axis AX1. More specifically, the diaphragm 80 is provided between the second lens 342 and the third lens 343, which is a position where a luminous flux diameter of the imaging light L0 is most narrowed in the lens system 34.

In the same manner as the first exemplary embodiment, the first optical axis AX1 and the third optical axis AX3 substantially coincide with the second direction Z and are parallel to each other. The position of the diaphragm 80 on the optical path of the central principal ray L11, that is, on the first optical axis AX1, and the position of the first diffraction element 50 in the second direction Z, that is, on the third optical axis AX3 coincide with each other.

Other configurations of the display apparatus 103 are the same as those of the first exemplary embodiment.

In the exemplary embodiment as well, it is possible to obtain the same effects as those of the first exemplary embodiment that the area when viewed from the first direction Y (up and down direction) can be made smaller than in the known apparatus and the display apparatus 103 can be reduced in size, and the load applied to the nose can be reduced and the use feeling of the display apparatus 103 can be improved.

The first diffraction element 50 is arranged at a position where the luminous flux diameter of the imaging light L0 is relatively widened, and the dimension in the up and down direction increases in some cases. In this case as well, according to the display apparatus 103 of the exemplary embodiment, the first diffraction element 50 can be put into the position where the imaging light L0 is most narrowed. As a result, the dimension of the display apparatus 103 in the height direction can be reduced.

Fourth Exemplary Embodiment

Below, a fourth exemplary embodiment according to the present disclosure will be described with reference to FIG. 9.

The basic configuration of a display apparatus according to the fourth exemplary embodiment is the same as that of the first exemplary embodiment, and arrangement of part of the optical components is different from that of the first exemplary embodiment. Therefore, the overall configuration of the display apparatus will not be described.

Figure 9:
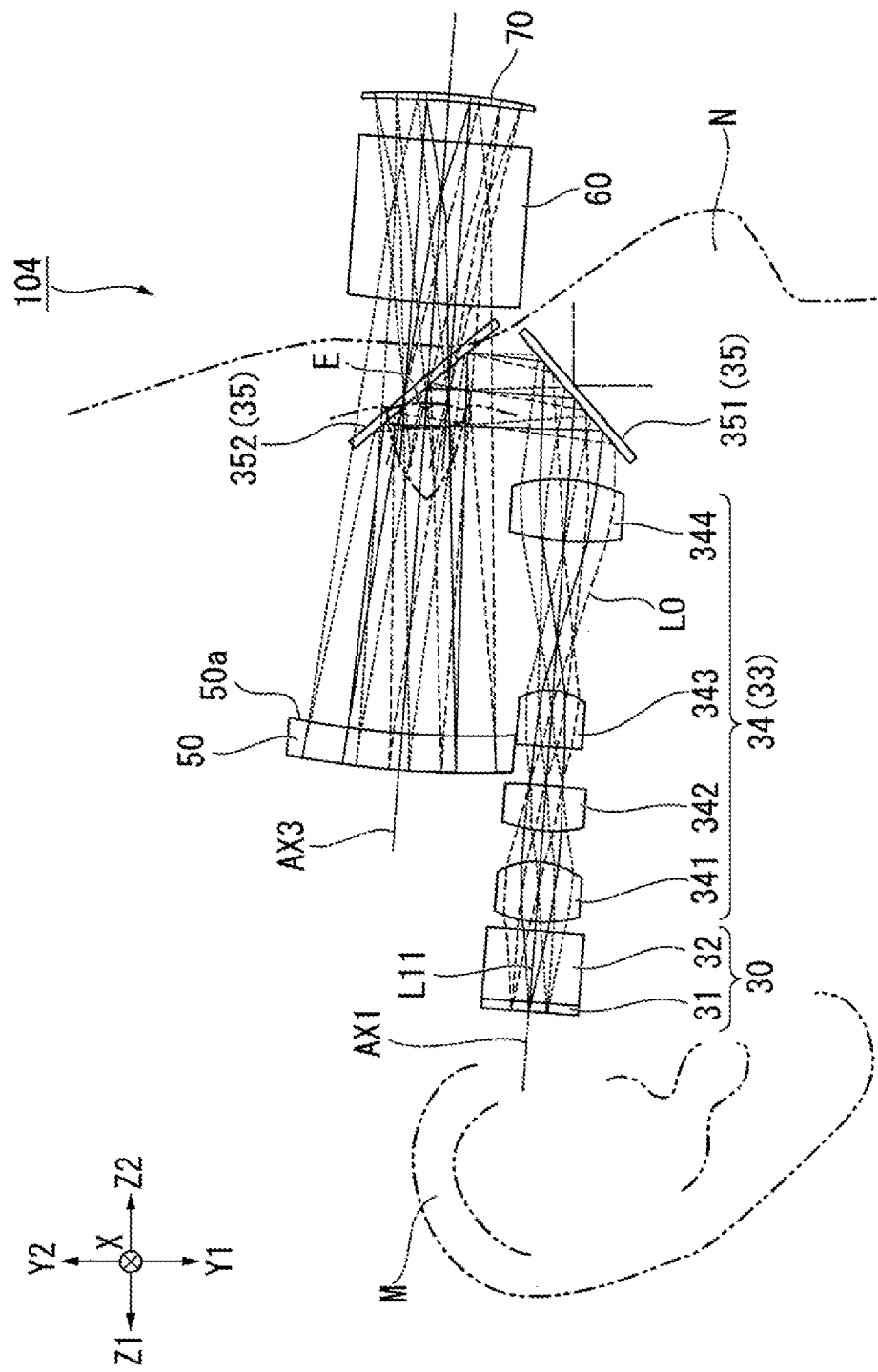
FIG. 9 is a side view illustrating a configuration of an optical system in a head-mounted display apparatus according to a fourth exemplary embodiment.

FIG. 9 is a side view illustrating the configuration of the optical system in the display apparatus according to the fourth exemplary embodiment.

In FIG. 9, the components common to those of the drawings of the first exemplary embodiment are denoted with the same reference numerals, and detailed description thereof is omitted.

As illustrated in FIG. 9, a display apparatus 104 according to the fourth exemplary embodiment includes the imaging light projecting device 30, the light-guiding optical system 33, the first diffraction element 50, the second mirror 60, and the second diffraction element 70.

The first mirror 35 that constitutes the light-guiding optical system 33 includes, in the same manner as the first exemplary embodiment, the first deflection section 351 and the second deflection section 352. However, a direction of the first mirror 35 is rotated by 180° relative to the direction of the first mirror 35 according to the first exemplary embodiment, the first deflection section 351 is located on a lower side, and the second deflection section 352 is located on an upper side. With this configuration, the first deflection section 351 deflects the imaging light L0 exiting from the imaging light generating device 31 toward the other side Y2 (upper side) of the first direction Y. Furthermore, the second deflection section 352 deflects the imaging light L0 deflected by the first deflection section 351 toward the one side Z1 (rear side) of the second direction Z.

The imaging light projecting device 30, the first lens 341, the second lens 342, the third lens 343, and the fourth lens 344 that constitute the lens system 34, and the first deflection section 351 of the first mirror 35 are arranged at the first height in the first direction Y (up and down direction). Furthermore, the first diffraction element 50, the second deflection section 352 of the first mirror 35, the second mirror 60, and the second diffraction element 70 are arranged at the second height in the first direction Y (up and down direction). When in the exemplary embodiment, the second height is higher than the first height, opposite to the first exemplary embodiment.

That is, when viewed along the traveling direction of the imaging light L0 exiting from the imaging light projecting device 30, the imaging light L0 travels at a substantially constant height through the lens system 34 until reaching the first mirror, after the optical path is bent upward by the first mirror 35, the imaging light travels at a substantially constant height at a position higher than that before being incident on the first mirror 35, and reaches the second diffraction element 70 via the first diffraction element 50 and the second mirror 60.

Other configurations of the display apparatus 104 are the same as those of the first exemplary embodiment.

In the exemplary embodiment as well, it is possible to obtain the same effects as those of the first exemplary embodiment that the area when viewed from the first direction Y (up and down direction) can be made smaller than in the known apparatus and the display apparatus 104 can be reduced in size, and the load applied to the nose can be reduced and the use feeling of the display apparatus 104 can be improved.

Note that as a posture of the display apparatus 104 in a state in which the observer wears the display apparatus 104, as in the first exemplary embodiment illustrated in FIG. 3, the first optical axis AX1 and the third optical axis AX3 may coincide with the substantially horizontal direction. Alternatively, as in the fourth exemplary embodiment illustrated in FIG. 9, the first optical axis AX1 and the third optical axis AX3 may be forwardly inclined in the direction in which the second diffraction element 70 side is lowered.

Note that the technical scope of the present disclosure is not limited to the above-described exemplary embodiments, and various modifications can be made to the above-described exemplary embodiments without departing from the spirit and gist of the present disclosure.

In the above-described exemplary embodiments, for example, the first deflection element is described so as to be constituted by the total reflection mirror as the example, but may be constituted by a total reflection prism, for example. Furthermore, the display apparatus may not necessarily include the second deflection element.

Furthermore, in the above-described exemplary embodiments, although the example is described in which the first diffraction element and the second diffraction element are each constituted by the reflection-type volume hologram, the first diffraction element and the second diffraction element may each be constituted by another hologram element, for example, such as a surface relief hologram, a blazed hologram, or the like. Even when these hologram elements are used, a thin diffraction element with high diffraction efficiency can be obtained.

Furthermore, it may be possible to change, as appropriate, the number, arrangement, shape, or other specific configurations of each constituent element of the head-mounted display apparatus given as examples in the exemplary embodiments described above.

What is claimed is:

1. A head-mounted display apparatus comprising:
an imaging light generating device;

a first deflection element including a first deflection section configured to deflect, in a first direction, imaging light emitted from the imaging light generating device and a second deflection section configured to deflect, in a second direction intersecting with the first direction, the imaging light deflected by the first deflection section;

a first diffraction element configured to diffract the imaging light deflected by the second deflection section; and a second diffraction element configured to diffract the imaging light diffracted by the first diffraction element to form an exit pupil, wherein when a principal ray of imaging light emitted from a center of a display region of the imaging light generating device and to be incident on the first deflection element is taken as a central principal ray, the central principal ray coincides with a normal line of a virtual plane located between the imaging light generating device and the first deflection section, and when a direction that the first direction is projected on the virtual plane is taken as a third direction of the virtual plane and a direction orthogonal to the third direction is taken as a fourth direction, a plane in the virtual plane through which the principal ray of imaging light emitted from an entire region of the display region passes is taken as a principal ray passing plane, a principal ray configured to pass through a point at a center of the principal ray passing plane in the third direction and at a first end of the principal ray passing plane in the fourth direction is taken as a first principal ray and a principal ray configured to pass through a point at a center of the principal ray passing plane in the third direction and at a second end of the principal ray passing plane in the fourth direction is taken as a second principal ray, a plane surrounded by the principal ray passing plane, the first principal ray, the second principal ray, and the first deflection section is taken as a first plane, and a plane surrounded by the second deflection section, the first principal ray, the second principal ray, and the first diffraction element is taken as a second plane, the first plane overlaps with at least a part of the second plane when viewed from the third direction and does not overlap with the second plane when viewed from the fourth direction.

2. The head-mounted display apparatus according to claim 1, wherein the first plane is non-parallel to the second plane when viewed from the fourth direction.

3. The head-mounted display apparatus according to claim 1, further comprising:

a diaphragm between the imaging light generating device and the first deflection element on an optical path of the central principal ray, wherein a position of the diaphragm on the optical path of the central principal ray and a position of the first diffraction element in the second direction coincide with each other.

4. The head-mounted display apparatus according to claim 1, the head-mounted display apparatus further comprising:

a second deflection element configured to reflect, toward the second diffraction element, the imaging light diffracted by the first diffraction element and configured to transmit external light.

5. The head-mounted display apparatus according to claim 1, wherein the first diffraction element and the second diffraction element include a reflection-type volume hologram.

* * * * *